US008312229B2

(12) United States Patent  
Bloks

(10) Patent No.: US 8,312,229 B2
(45) Date of Patent: Nov. 13, 2012

(54) METHOD AND APPARATUS FOR SCHEDULING REAL-TIME AND NON-REAL-TIME ACCESS TO A SHARED RESOURCE

(75) Inventor: Rudolf Henricus Johannes Bloks, Sunnyvale, CA (US)

(73) Assignee: Meyer Bros. Technology Group LLC, Dover, DE (US)

( * ) Notice: Subject to any disclaimer, the term of this patent is extended or adjusted under 35 U.S.C. 154(b) by 1390 days.

(21) Appl. No.: 11/457,762

(22) Filed: Jul. 14, 2006

(65) Prior Publication Data

US 2006/0253675 A1 Nov. 9, 2006

Related U.S. Application Data

(63) Continuation of application No. 10/318,435, filed on Dec. 13, 2002, now Pat. No. 7,093,256.

(51) Int. Cl.
*G06F 13/00* (2006.01)
(52) U.S. Cl. ............. 711/151; 711/154; 711/167; 710/5
(58) Field of Classification Search .................. 711/147, 711/150–152, 167–169; 718/102–104, 107
See application file for complete search history.

(56) References Cited

U.S. PATENT DOCUMENTS

| | | | |
|---|---|---|---|
| 4,989,133 A | 1/1991 | May et al. | |
| 5,291,614 A * | 3/1994 | Baker et al. | 712/35 |
| 5,325,525 A | 6/1994 | Shan et al. | |
| 5,586,264 A * | 12/1996 | Belknap et al. | 725/115 |
| 5,640,563 A * | 6/1997 | Carmon | 718/102 |
| 5,721,922 A | 2/1998 | Dingwall | |
| 5,761,692 A * | 6/1998 | Ozden et al. | 711/4 |
| 5,902,352 A | 5/1999 | Chou et al. | |
| 5,974,439 A | 10/1999 | Bollella | |
| 5,995,745 A | 11/1999 | Yodaiken | |
| 6,028,843 A | 2/2000 | Delp et al. | |
| 6,081,505 A | 6/2000 | Kilkki | |
| 6,105,048 A | 8/2000 | He | |
| 6,112,221 A | 8/2000 | Bender et al. | |
| 6,167,425 A | 12/2000 | Beckhoff | |
| 6,182,197 B1 | 1/2001 | Dias et al. | |
| 6,195,701 B1 | 2/2001 | Kaiserswerth et al. | |
| 6,282,560 B1 | 8/2001 | Eilert et al. | |
| 6,378,052 B1 * | 4/2002 | Genduso et al. | 711/158 |
| 6,385,638 B1 | 5/2002 | Baker-Harvey | |
| 7,093,256 B2 | 8/2006 | Bloks | |

(Continued)

OTHER PUBLICATIONS

Chang et al.; Department of Computer Science; Courant Institute of Mathematical Sciences, New York University, *"Exploiting Application Turability for Efficient, Predictable Parallel Resource Management"* Oct. 7, 1998, pp. 1-18.

(Continued)

*Primary Examiner* — Brian Peugh
*Assistant Examiner* — Nicholas Simonetti
(74) *Attorney, Agent, or Firm* — Stolowitz Ford Cowger LLP

(57) ABSTRACT

A method and apparatus are provided in a computing environment for scheduling access to a resource. The method grants access to the resource by a non-real-time request when the non-real-time request can be completed before the latest possible start time at which a first real-time request must start service to timely complete all actual and anticipated real-time requests, otherwise granting the first real real-time request access to the resource.

22 Claims, 8 Drawing Sheets

$R_i$ = requester (i=1... N)
T = system time
$T_{Li}$ = service start time
$T_{SRi}$ = service completion time
$T_i$ = required service completion time
$L_i$ = latency of requester R
$D_i$ = duration of requester R
CT = current system time
$W_i$ = window of time

U.S. PATENT DOCUMENTS

| | | | |
|---|---|---|---|
| 7,165,252 B1 * | 1/2007 | Xu | 718/102 |
| 2002/0019843 A1 * | 2/2002 | Killian et al. | 709/102 |
| 2004/0100967 A1 | 5/2004 | Robotham et al. | |
| 2004/0114516 A1 | 6/2004 | Iwata et al. | |

OTHER PUBLICATIONS

Stolowitz Ford Cowger LLP, "Listing of Related Cases", Apr. 26, 2011, 1 page.

* cited by examiner

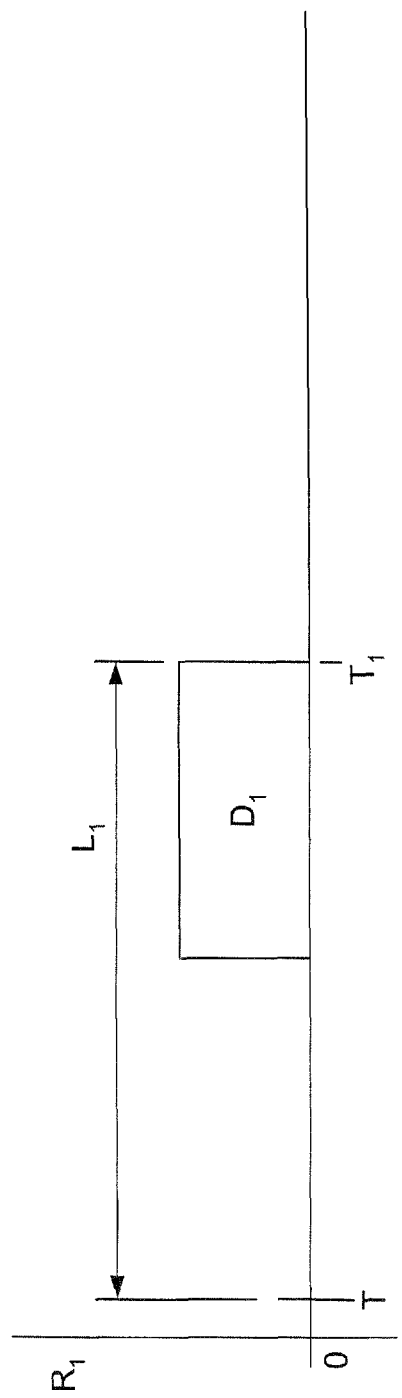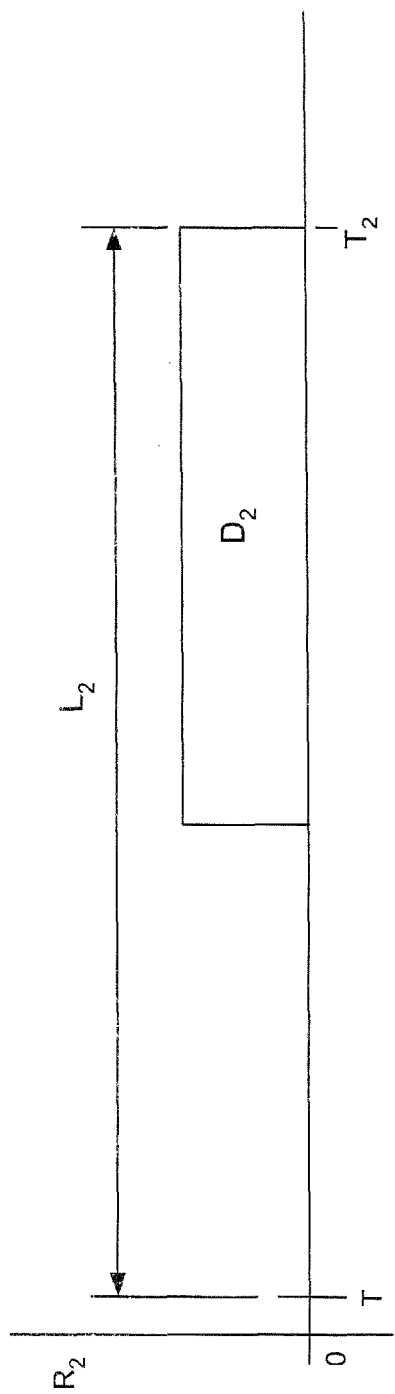
FIG. 4A
FIG. 4B

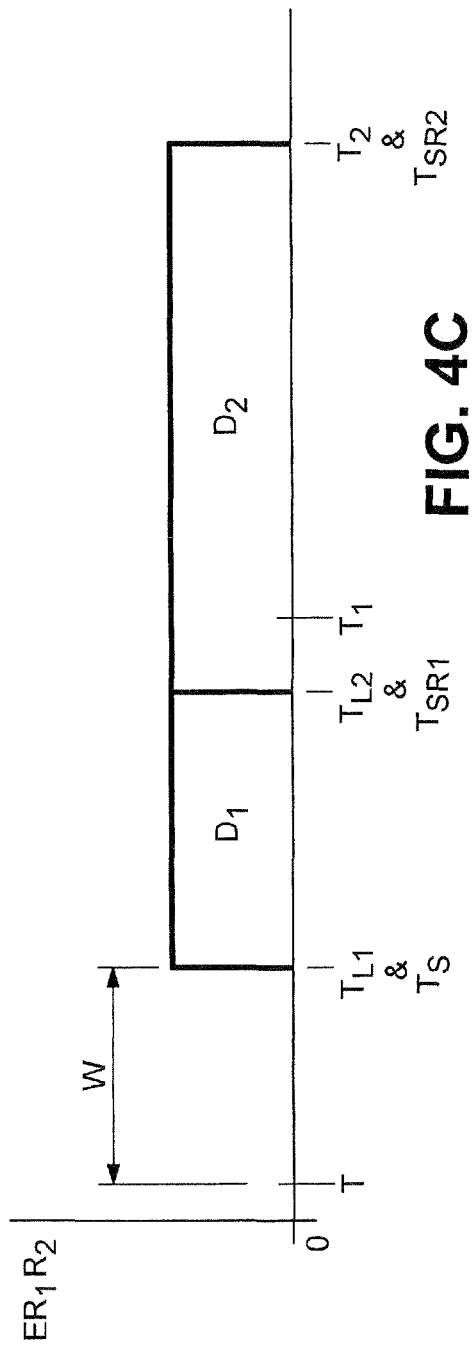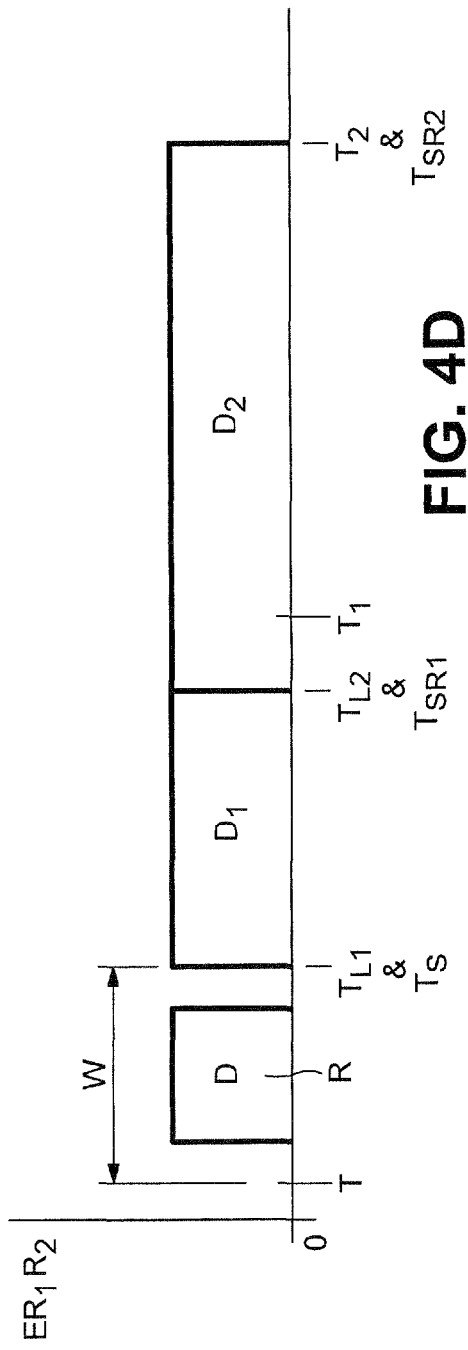

METHOD AND APPARATUS FOR SCHEDULING REAL-TIME AND NON-REAL-TIME ACCESS TO A SHARED RESOURCE

This application is a continuation of U.S. patent application Ser. No. 10/318,435 filed Dec. 13, 2002, and incorporated here by reference.

BACKGROUND

In multimedia processing systems, large amounts of data are processed in real time and typically stored in a memory between processing stages. For example, one or more processors read data from this memory, perform one or more processing steps, and write a result back into memory. Input/output devices ultimately perform the functions of sending the final result out of the system, for example to a display device and receiving initial data into the system.

Typically, the input and output functions require real-time data to be transferred at a specific rate. Any deviations from this rate can be noticeable as artifacts, such as audio clicks, video distortion, etc, or could cause connected subsystems to fail in other ways. In order to guarantee that data can be transferred in/out of the system at a fixed rate, the devices responsible for it must have certain guarantees for accessing the memory in terms of latency and bandwidth. Latency is the time between when a device requests access to memory for data read/write task and competing accessing the memory. The end of the latency period is the deadline by which the service request must be completed, and is sometimes referred to in the specifications as required-service-completion time. Duration is how long it takes to execute the request from start of service to completion. Bandwidth is the number of such accesses that can be performed per time unit.

The processing units have far less strict requirements, since they operate at a larger data granularity, such as entire video or audio frames, rather than individual pixels or samples. A short delay in memory access can be compensated for by a higher access rate later, thus still meeting any longer-term timing requirements.

Due to this nature, systems with both real-time and non-real-time access requirements typically operate by giving priority to the real-time devices and allowing the non-real-time devices access only when no real-time device has a request outstanding. Variants on this system may limit such priority to a maximum amount of time after which the non-real-time devices are serviced to prevent what is called 'starvation' of these lower-priority devices. A disadvantage of this approach is that the non-real-time devices suffer from decreased performance because they have to wait for access to the memory while the real-time devices go first. This happens because the scheduling algorithm used to control access has no knowledge of the service deadline requirements of the real-time requests.

One well-known method for scheduling real-time requests is the Earliest Deadline First algorithm (EDF). According to EDF, of all real-time requests waiting processing, the request having the earliest completion deadline receives the highest priority. EDF becomes problematic when there are both real-time and non-real-time clients in the system. Pure EDF cannot handle this, and the simple "extension" of this algorithm is to assign any leftover bandwidth to non-real-time clients. This is because priority is always given to real-time clients, even if handling a non-real-time client first would not endanger the deadlines of all real-time clients. When a non-real-time client has to wait for access, it is typically unable to continue operation until that access has been completed, forcing it to idle or stall, thus reducing its performance.

The original EDF is a fairly simple algorithm that probably can be implemented efficiently in software. When an extended EDF algorithm using software is made to include allocation of time to non-real-time requests, a processor must execute the extended EDF algorithm for priority allocation. This causes a substantial overhead of the processor time and reduces the portion of processor time available for the actual processing of all requests.

Consequently, a new scheduling method is needed for controlling access to any type of shared resource by multiple devices, the new method giving priority to non-real-time devices as long as the service deadlines for the outstanding real-time requests are met. That is, the new scheduling method should give priority to a non-real-time request even if a real-time request is pending when the non-real-time request can be performed without compromising the latency required by that real-time device. A hardware device is also needed for implementing the scheduling method, thus removing the scheduling load from the processor unit of the computing device. This frees up the processor unit.

In view of the foregoing, there is a need in the art for a new and improved method and device for extending existing scheduling algorithms to include requests by non-real-time devices and giving those devices priority if, and only if, all current and possible future real-time requests can still be executed on time.

SUMMARY

In one embodiment of the invention, a method is provided for scheduling access to a resource having a capacity for real-time and non-real-time requests, each request having a latency and a duration. The method includes the steps of scheduling real-time requests, and granting a priority access to the shared resource to a non-real-time request when the pending real-time requests and the non-real-time request do not exceed the capacity of the resource. This improves system performance while still guaranteeing that real-time requests will meet service deadlines. The method may be implemented by hardware.

Such a method can extend the algorithms commonly used for scheduling real-time request by giving non-real-time requests a priority to run first if, and only if, all current and possible future real-time requests can still be executed on time. Furthermore, the scheduling may be performed by a dedicated hardware device to reduce the load on the processor.

DESCRIPTION OF THE DRAWINGS

The features of the present invention which are believed to be novel are set forth with particularity in the appended claims. The invention, together with further objects and advantages thereof, may best be understood by making reference to the following description taken in conjunction with the accompanying drawings, in the several figures of which like reference numerals identify like elements, and wherein:

FIGS. 4a-d illustrate scheduling two real-time service requests such that a window of time W is available for priority servicing of a non-real-time request R having a duration D according to an embodiment of the invention.

DETAILED DESCRIPTION

In the following detailed description of exemplary embodiments of the invention, reference is made to the accompanying drawings, which form a part hereof. The detailed description and the drawings illustrate specific exemplary embodiments by which the invention may be practiced. These embodiments are described in sufficient detail to enable those skilled in the art to practice the invention. It is understood that other embodiments may be utilized, and other changes may be made, without departing from the spirit or scope of the present invention. The following detailed description is therefore not to be taken in a limiting sense.

Figure 1:
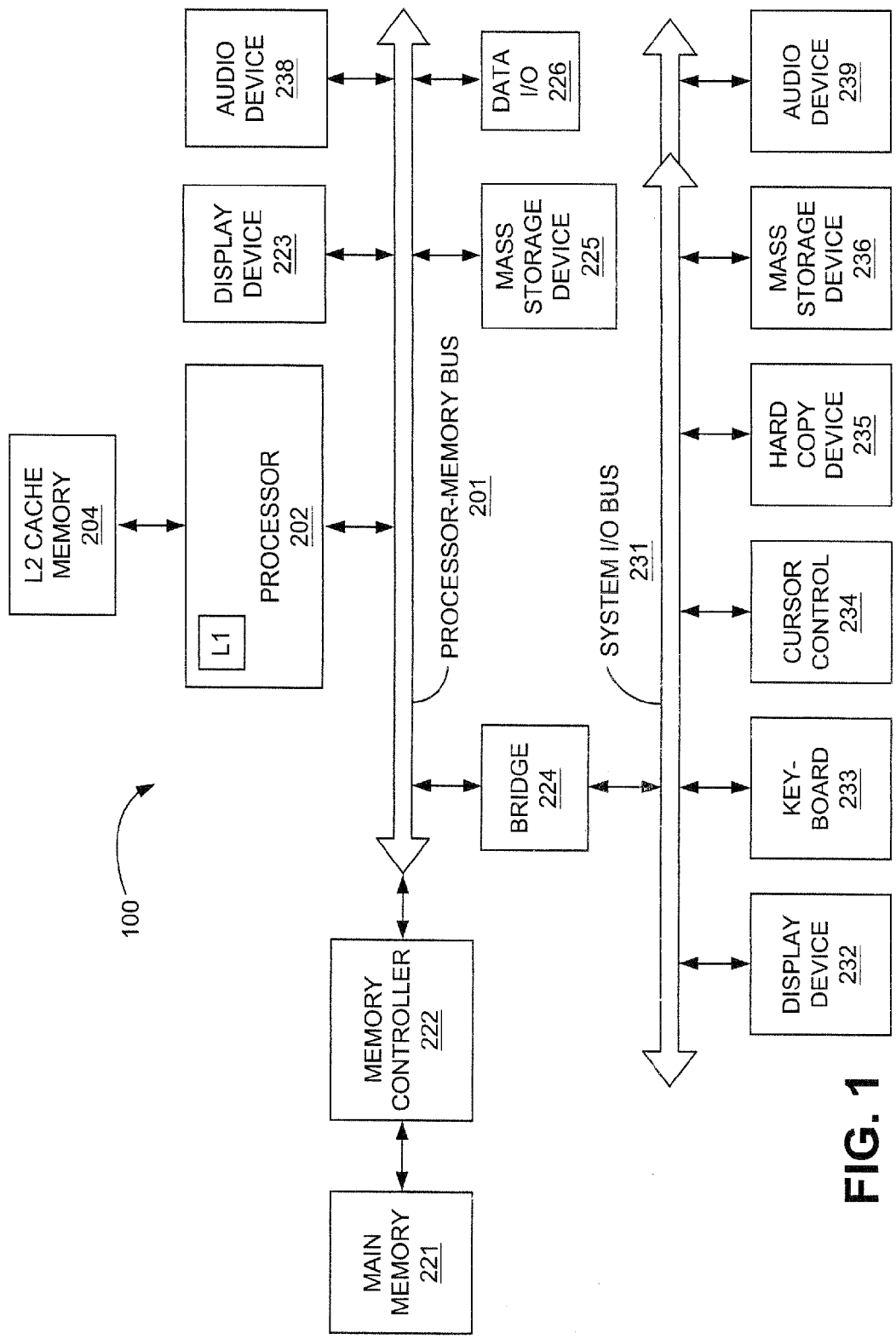
FIG. 1 is a block diagram of a computing device for multimedia processing, such as streaming video from the Internet video teleconferencing, surveillance systems, digital imaging, communications, and media applications.

FIG. 1 a block diagram of a computing device 100 for multimedia processing, such as streaming video from the Internet, video teleconferencing, surveillance systems, digital imaging, communications, and media applications. The computing device 100 may also be used for DVD and CD playback, and presenting multimedia content on a television display or through a set-top box. The computing device 100 generally comprises a processor-memory bus or other communication means 201 for communicating information. The processor-memory bus 201 includes address, data and control buses and is coupled to multiple devices or agents. The processor 202 may include a small, extremely fast internal cache memory, commonly referred to as a level one (L1) cache memory for temporarily storing data and instructions on-chip. Multiple processors may be used in the computing device 100 for processing information in conjunction with processor 202. A second processor may comprise a parallel processor, such as a processor similar to, or the same as, the processor 202. Alternatively, an additional processor may comprise a co-processor, such as a digital signal processor. In addition, a bigger, slower level two (L2) cache memory 204 can be coupled to processor 202 for temporarily storing data and instructions for use by processor 202. In one embodiment, the processor 202 is an Intel architecture-compatible microprocessor, although the processor may be another type of processor. Alternatively, system 100 could be a desktop personal computer designed for either home or office use, or a larger mainframe or file-server system.

The processor-memory bus 201 provides system access to the memory and input/output (I/O) subsystems. A memory controller 222 is coupled to the processor-memory bus 201 for controlling access to a random access memory (RAM) or other dynamic storage device 221 (commonly referred to as a main memory) for storing information and instructions for the processor 202. A mass data storage device 225, such as a magnetic disk and disk drive for storing information and instructions, a display device 223, such as a cathode ray tube (CRT), a liquid crystal display (LCD), etc., for displaying information to the computer user, and an audio device 238, such as a loud speaker for communicating sound to the computer user, may be coupled to the processor-memory bus 201. In addition, a data input/output (I/O) device 226 is coupled to the processor-memory bus 201 for receiving or transmitting data between the computing device 100 and other devices or communications medium (not shown).

An I/O bridge 224 is coupled to the processor-memory bus 201 and system I/O bus 231 to provide a communication path or gateway for devices on either processor-memory bus 201 or I/O bus 231 to access or transfer data between devices on the other bus. Essentially, the I/O bridge 224 is an interface between the system I/O bus 231 and the processor-memory bus 201, and may be a hardware controller, a USB controller, or other device known in the art for interfacing peripherals with the processor-memory bus 201. The system I/O bus 231 communicates information between peripheral devices in the computer system. Devices that may be coupled to the system I/O bus 231 include a display device 232, which may be similar to the display device 223, a keyboard 233 including alphanumeric and other keys, etc., for communicating information and command selections to other devices in the computer system (for example, the processor 202), a mouse 234 for controlling cursor movement, and an audio device 239, which may be similar to the audio device 238. Moreover, a hard copy device 235, such as a plotter or printer, and a mass storage device 236, such as a magnetic disk and disk drive, may also be coupled to the system I/O bus 231.

Use of the computing device 100 for multimedia processing may not require all of the above components. For example, certain implementations of the computing device may include additional processors or other components. For example, the display device 223, audio device 238, or mass storage device 225 may not be coupled to the processor-memory bus 201. Furthermore, the peripheral devices shown coupled to the system I/O bus 231 may be coupled directly to the processor-memory bus 201; in addition, in some implementations only a single bus may exist with the processor 202, memory controller 222, and peripheral devices 232-236 coupled to the single bus.

Figure 2:
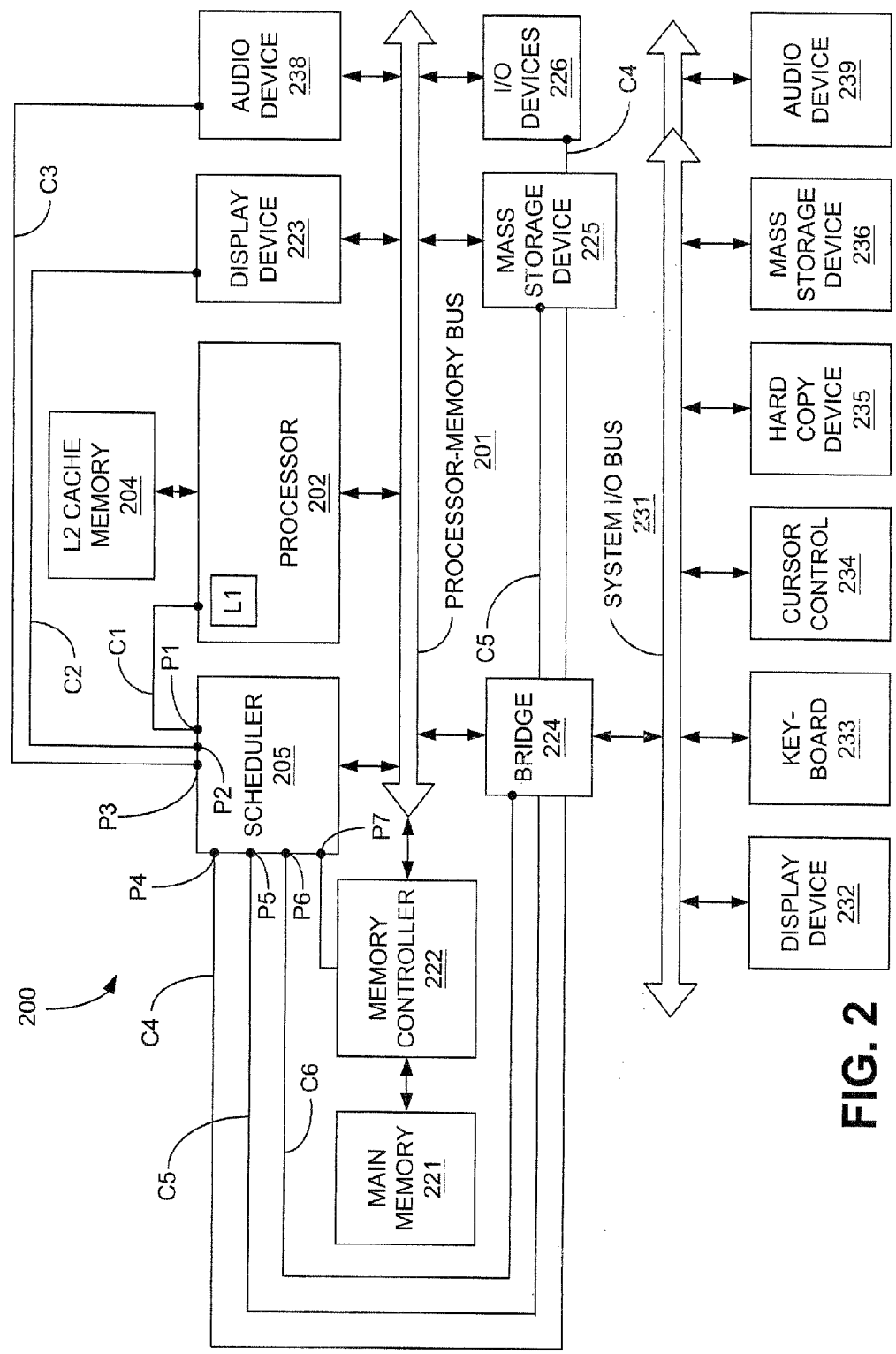
FIG. 2 shows an overview of a commuting device for multimedia processing that includes a scheduler, in accordance with an embodiment of the present invention.

FIG. 2 shows an overview of a computing device 200 for multimedia processing that includes a scheduler 205, in accordance with an embodiment of the present invention. The computing device 200 is substantially similar to the computing device 100, and additionally includes the scheduler 205 coupled to the processor-memory bus 201.

Using the computing device 100 of FIG. 1 for multimedia processing will require scheduling real-time requests to prevent artifacts in the output and input. As described previously, the EDF algorithm is commonly used in computing devices, such as computing device 100, for multimedia processing. This algorithm schedules real-time requests to guarantee on-time delivery of data necessary for multimedia processing, and will not run a non-real-time request until all real-time requests have been serviced. When all bandwidth is needed for real-time requests, non-real time requests wait for access and the computing device 100 may be unable to continue operation until real-time access has been completed, forcing it to idle or stall, and degrading performance or completely halting its performance. The scheduler 205 extends the EDF algorithm by giving non-real-time request a priority to run if, and only if, all current and possible future real-time requests can still be executed within the required time constraints. This improves system performance by giving non-real-time requests some priority while still guaranteeing that real-time request will meet service deadlines. In the embodiment illustrated, the scheduler 205 schedules access to the main memory 221 by the memory controller 222, display 223, audio device 238, and I/O devices 226 (the real-time devices). In other embodiments, however, the scheduler 205 may schedule access to another device by other real-time and non-real-time devices. Furthermore, in this embodiment the scheduler 205 is a dedicated hardware device, although it may be omitted from the computer 200 and another device such as the processor 202 may execute the scheduling algorithm. But implementing the scheduling algorithm with the dedicated scheduler 205 frees the processor 202 to devote more processing time to other requests.

I/O device 226 typically is a digital I/O device, or may be a plurality of digital devices. Such devices typically have limited buffer capability and high bandwidth needs, such as live-video capture units, digital video and audio input/output ports, high-speed communication controllers, and the like. Input devices of this nature must offload their data quickly into main memory 221 before more data arrives which would overflow their small internal buffers. Output devices of this nature must read more data from memory quickly before their currently buffered data has all been sent out to prevent them from running out of data.

More specifically, the scheduler 205 may be any type of hardware or software device capable of executing logical instructions in a computing environment. For example, the scheduler 205 may be a single hardware device that is integrated on the same chip as the processor 202, or may be a separate device, such as an Application Specific Integrated Circuit (ASIC) or a programmable logic device (PLD) coupled to the processor-memory bus 201. Alternatively, the scheduler 205 may be a plurality of cooperating devices. The scheduler 205 includes logic that implements the scheduling algorithm and grants access to the shared resource (here the memory 221) by requesting devices according to the calculated schedule. The scheduler 205 includes ports P1 through P7, which are coupled to the devices requesting access to the memory 221. Three of the ports P2, P3, and P4 are configured as real-time ports and are thus coupled to the display device 223, audio device 238, and data I/O device 226, which are the real-time requesters. Consequently, the number M of real-time requesters handled by the scheduler 205 equals three in this embodiment, although M can have other values in other embodiments. M is a design determination that establishes the maximum number of real-time clients or requesters that may be handled by the scheduler 205. The remaining ports P1, P5 and P6 are configured as non-real-time ports and are thus coupled to the processor 202, bridge 224, and mass-storage device 225, which are the non-real-time requesters. Memory controller 222 is not a client of the scheduler 205 because it does not generate requests, but it does receive directions from the scheduler 205 via port P7. The scheduler 205 also includes a memory (not shown) that stores the latency L and the maximum duration D for each of the real-time requesters, and the maximum duration for each of the non-real-time requests. These values may be pre-programmed into the scheduler, or may be programmed into the scheduler memory during boot of the system 200, or during another time.

Still referring to FIG. 2, the scheduler 205 schedules access to the main memory 221 giving priority to one or more non-real-time requests if, and only if, all current and possible future real-time requests can still be executed on time. As discussed above, the scheduler 205 stores a minimum access latency $L_i$ and a maximum access duration $D_i$ of each real-time requester $R_i$ (i=requester index for i=1 . . . ). When a real-time device requests access to the memory 221, the device can provide values of Li and Di, or the scheduler 205 can calculate Li and Di based on the request. But when the scheduler takes into account potential real-time requests (i.e., request that could be made but that have not yet been made), it uses the stored value for Li and the stored maximum value for Di. As discussed below in conjunction with FIG. 3, the scheduler 205 updates the actual/potential request queue every clock cycle and allows only one device at a time (whether real-time or non-real-time), to access the memory 221.

Figure 3:
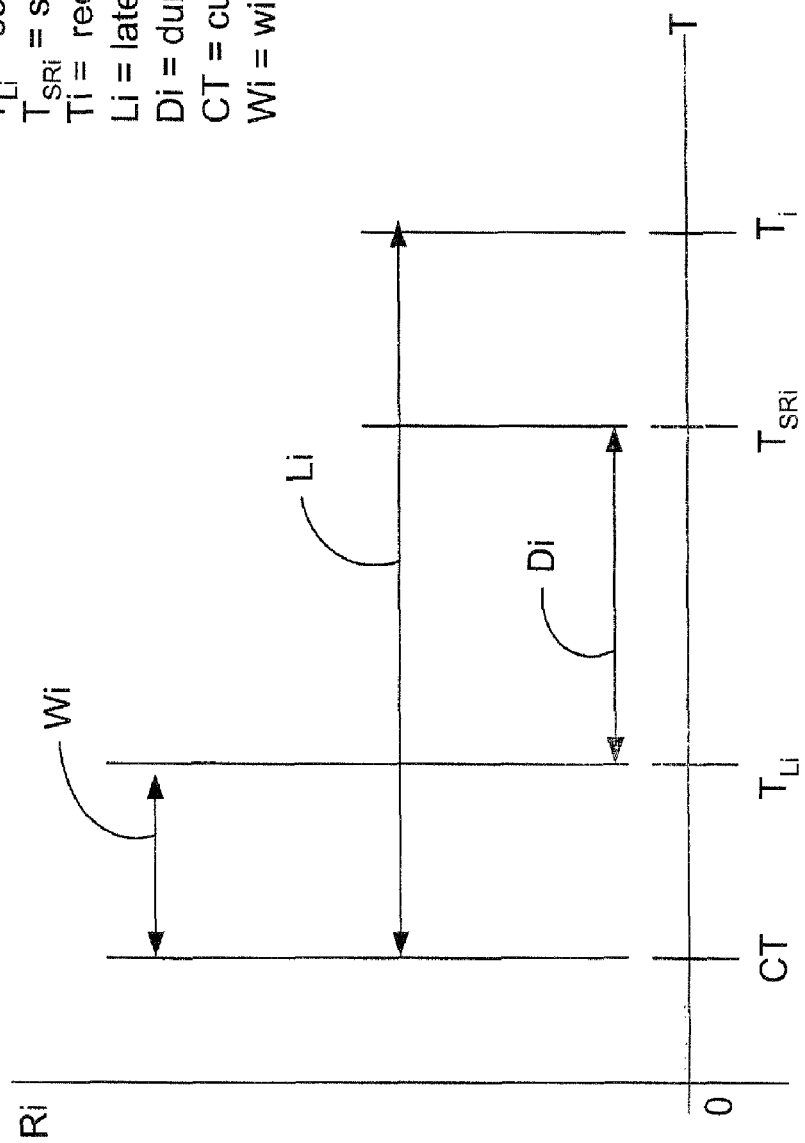
FIG. 3 illustrates several parameters of a real-time service request by a requester $R_i$ used in scheduling service by a shared resource according to an embodiment of the invention.

FIG. 3 illustrates several parameters of a real-time service request by a real-time requester $R_i$ according to an embodiment of the invention. As discussed above, the latency $L_i$ represents the time between when the requester of request $R_i$ issues the request at current time T for service to the scheduler 205 and the required service completion time $T_i$. The duration $D_i$ represents the duration of the access requested, i.e., how long the requester of request $R_i$ will need to access the memory discussed above, the duration $D_i$ may vary depending on the type of request. For example, the more data that the requester of request $R_i$ needs to transfer to/from the memory 221, the longer the duration $D_i$ of the access.

Because the duration $D_i$ is usually less than the latency $L_i$, and because the service requirements of the requester of request $R_i$ are satisfied when the service completion time $T_{Sri}$ occurs no later than the required service completion time $T_i$ ($T_{Sri}=T_i$), a window of time $W_i$ may exist between when a requester $R_i$ issues a service request at time T and when the service must be completed at time $T_i$. When a non-real-time request is pending and has a duration D that is less than or equal to the window of time $W_i$, the scheduler 205 may grant the non-real-time request priority for servicing during the window $W_i$ and still allow for timely service of the real-time request $R_i$. Consequently, as described below, in one aspect of the invention, the scheduler 205 looks ahead and determines whether a window of time $W_i$ is available after all received and potential real-time requests are accounted for, and if so, whether a pending non-real-time request can be serviced during $W_i$.

FIGS. 4a-d illustrate scheduling two real-time service requests such that a window of time W is available for priority servicing of a non-real-time request R having a duration D, according to an embodiment of the invention.

As illustrated in FIGS. 4a-b, at current time T, two real-time requesters have issued requests $R_1$ and $R_2$ having latencies $L_1$ and $L_2$, and durations $D_1$ and $D_2$, respectively. FIG. 4c illustrates the two real-time requests $R_1$ and $R_2$ scheduled in a manner that provides a window of time W available for priority servicing of a non-real-time request having a duration D that is less than or equal to W. While FIGS. 4a-c illustrates aspects of the algorithm for two real-time requests, the scheduler 205 can schedule any number of real-time requests in a similar manner. FIG. 4d illustrates a non-real-time request R having a duration D scheduled in window of time W to be performed before real-time request $R_1$.

Scheduling or sequencing real-time requests $R_1$ and $R_2$ is relatively straightforward with EDF scheduling. The process closest to its deadline has highest priority. EDF works relatively well when sufficient time exists to start request $R_1$ and finish it by time $T_1$, and then start request $R_2$ and finish it by time $T_2$. However, EDF does not schedule non-real-time requests unless no real-time requests are pending.

As will be described in additional detail below, the scheduler 205 pushes all the real-time requests out as far as possible in time to open a maximum window W for scheduling non-real-time requests. The scheduler 205 looks at all real-time requests and determines the latest (or furthest out in time)

service start time that will allow all real-time requests to be performed. This provides the maximum window W. For the example illustrated in FIGS. 4a-c where $D_2 > T_2 - T_1$, the scheduler 205 schedules the real-time request $R_1$ for a time of start TS at $TL_1 = T_2 - D_2 - D_1$ because it has the earliest required service completion time $T_1$. That the service of the request $R_1$ will be completed before $T_1$ is of no consequence because $T_1$ is merely the latest time for completion of the request $R_1$; completion of the request $R_1$ before $T_1$ is allowed. The scheduler 205 schedules the real-time request $R_2$ to start at $TL_2 = T_2 - D_2$, When $D_2 = T_2 - T_1$, the scheduler 205 schedules the real-time request $R_1$ to complete at service completion time $T_1$.

The scheduling allocates sufficient time to guarantee performance of the real-time service request $R_1$ and $R_2$, and provide the window of time W for a non-real-time request having a duration D less than or equal to W. If at current time T no real-time request $R_2$ has been received from the real-time requester, then the scheduler 205 anticipates a real-time request $R_2$ having the duration $D_2$ so that sufficient time is reserved in case the requester $R_2$ issues such a request before time $T_{SR1}$. Typically, the scheduler 205 updates the schedule of all pending and potential requests once each clock cycle of the shared resource.

A conventional EDF algorithm is guaranteed to produce a workable schedule if $$\sum_i \frac{D_i}{L_i} \leq 1,$$

which corresponds to the requirement that the combined real-time traffic requirements do not exceed the bus capacity at any time. The standard EDF works by servicing the request with the earliest completion deadline next. Under the above condition, this is guaranteed to yield a schedule where all deadlines for real-time requests are met, but may delay non-real-time requests until no real-time requests are pending, which will eventually happen if the sum of all real-time bandwidth requirements does not exceed capacity. As this sum approaches capacity, the delays may grow very long. When the remaining non-real-time bandwidth is less than the amount needed for a requested non-real-time transaction, the delay becomes infinite, and starvation occurs.

The scheduler 205 grants a priority access to the shared resource for a non-real-time request while timely handling up to M real-time requesters, each requester making one real-time request at a time, and each request $R_i$ having a latency $L_i$ and a duration $D_i$. To do this, the scheduler 205 makes the following assumptions: for any requester, the time between its requests $R_i$ must be at least $L_i$, since it is processing data at a fixed (or maximum) rate corresponding to the amount transferred in one request divided by the time between requests ($L_i$). If a requester has a variable data rate, then the scheduler 205 assumes the peak rate. Furthermore, the latency $L_i$ of all requesters is known by the scheduler 205 a priori, based on the system configuration or data stored in the scheduler or available to the scheduler. If the duration depends on request parameters such as requested data size, etc., the scheduler 205 may be unable to accurately determine the duration for an anticipated request. Therefore, the scheduler 205 uses a worst-case value to guarantee that it never grants a non-real-time request where this could lead to missing a real-time deadline for a device that currently has no request pending (and which the scheduler thus schedules as an anticipated request). Additionally, all devices with real-time transfers and their data rates are known and guaranteed not to exceed the available capacity.

If at time T, there are N ($N \leq M$) real-time requests with required completion times $T_i = T + L_i$, for $I = 1 \ldots N$ and durations $D_i$, then the scheduler effectively extends EDF with non-real-time request handling by:

1. adding 'anticipated' requests for the M-N requesters that currently have no active pending request, using their known latency values $L_i$, so that there are now M request to be processed;

2. preparing an ordered list of real-time requests as requests $R_1$-$R_m$ according to completion time $T_{R1} \ldots T_{RM}$, each request R having durations $D_{R1} \ldots D_{RM}$, such that $R_1$ is earliest request for service to be completed as determined by completion time $T_{R1}$, and $R_M$ is the latest;

3. calculating a latest service start time $T_{L1}$ for every request sub-sequence shown below for pending and anticipated real-time requests, as follows:

$$R_1 \text{ only}: T_{L1} = T_{R1} - D_{R1}$$

$$R_2 \ldots R_1 : T_{L2} = T_{R2} - D_{R2} - D_1$$

$$\ldots$$

$$R_M \ldots R_1 : T_{LM} = T_{RM} - D_{RM} - \ldots - D_{R1};$$

4. selecting a service start time $T_S$ that is the earliest of all the calculated latest service start time $T_{Li}$ for every sub-sequence ($T_S = \text{MINi}(T_{Li})$);

5. when $T = D < T_S$ for a non-real-time request R, granting the non-real-time request; otherwise 6. granting the real (not anticipated) real-time request having the earliest system value access to the resource.

$\text{MINi}(T_{Li})$ is the time nearest time T that $R_1$ must be started to finish all M real-time requests. In other words, of all the latest service start times, ($T_{Li}$), $\text{MINi}(T_{Li})$ is the earliest of the latest service start times, the time that is closest to current time T.

The step of adding the 'anticipated' request makes worst-case prediction about real-time requests that are currently inactive. This step assumes that all real-time requesters that have not requested service will do so immediately following the current evaluation of the scheduler algorithm at time T. Thus, all the latency L requirements of the requests will be met. The requester may not always place a request, but an access to the shared resource of their maximum duration D is reserved for them. The anticipated duration would be a worst-case value that is known by the scheduler 205, e.g., it could be a programmed value for each requests just like the latency values.

The step of ordering the requests produces a list of all requests, both actual and anticipated, in ascending order of required completion time, i.e., the first element in the list (R1) is the earliest, or the first request to be completed, the next element (R2) is the next one to complete, and so on. Request RM is the latest request scheduled to be completed. This is a dynamic ordering system, and the order of requests will likely change each time the algorithm is run.

The step of calculating the latest service start time for every sub-sequence determines the latest possible time at which the first element must start service in order to satisfy the on-time completion of all elements in the list. On-time completion of the $i^{th}$ element can be guaranteed if the list is started no later than the completion time for element I minus the duration of all list elements up to and including i. This latest start time is calculated for all list elements, and the earliest of all these start time values is taken as the absolute latest time to start service of the list of real-time request MINi($T_{Li}$). This is the time to start real-time requests $R_1$ to be sure request $R_M$ is timely completed.

If MINi($T_{Li}$) is some time D after current time T, then a window W exists of width D for the scheduler 205 to safely grant service to a non-real-time request R whose duration will not exceed D. There is a method for selecting which non-real-time request will be granted service during the window W that is beyond the scope of the invention described in these specifications. For example, the non-real time requests may have their own arbitrator (not shown), which will grant one or more of the requests access during the window W. Every other non-real-time request waits until the selected non-real-time request is completed.

The above steps are performed once for each time the scheduler grants access to a request. After the request is completed, the scheduler will repeat the above scheduling steps with all then currently outstanding and anticipated real-time request to determine which request to service next, and whether a window W is available for servicing a non-real-time request.

Figure 5:
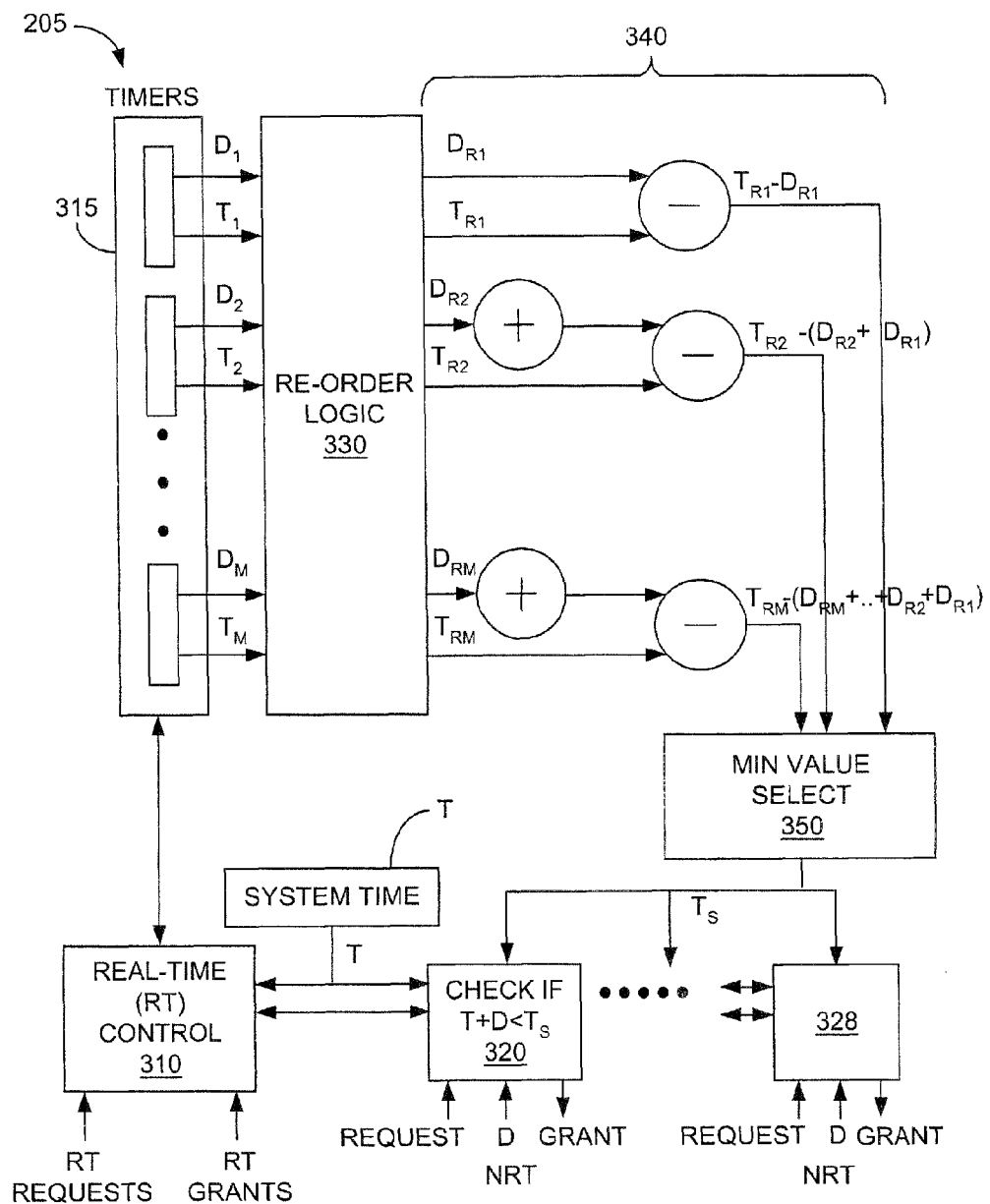
FIG. 5 is a schematic representation of a scheduler in a hardware configuration, according to an embodiment of the invention.
Figure 6:
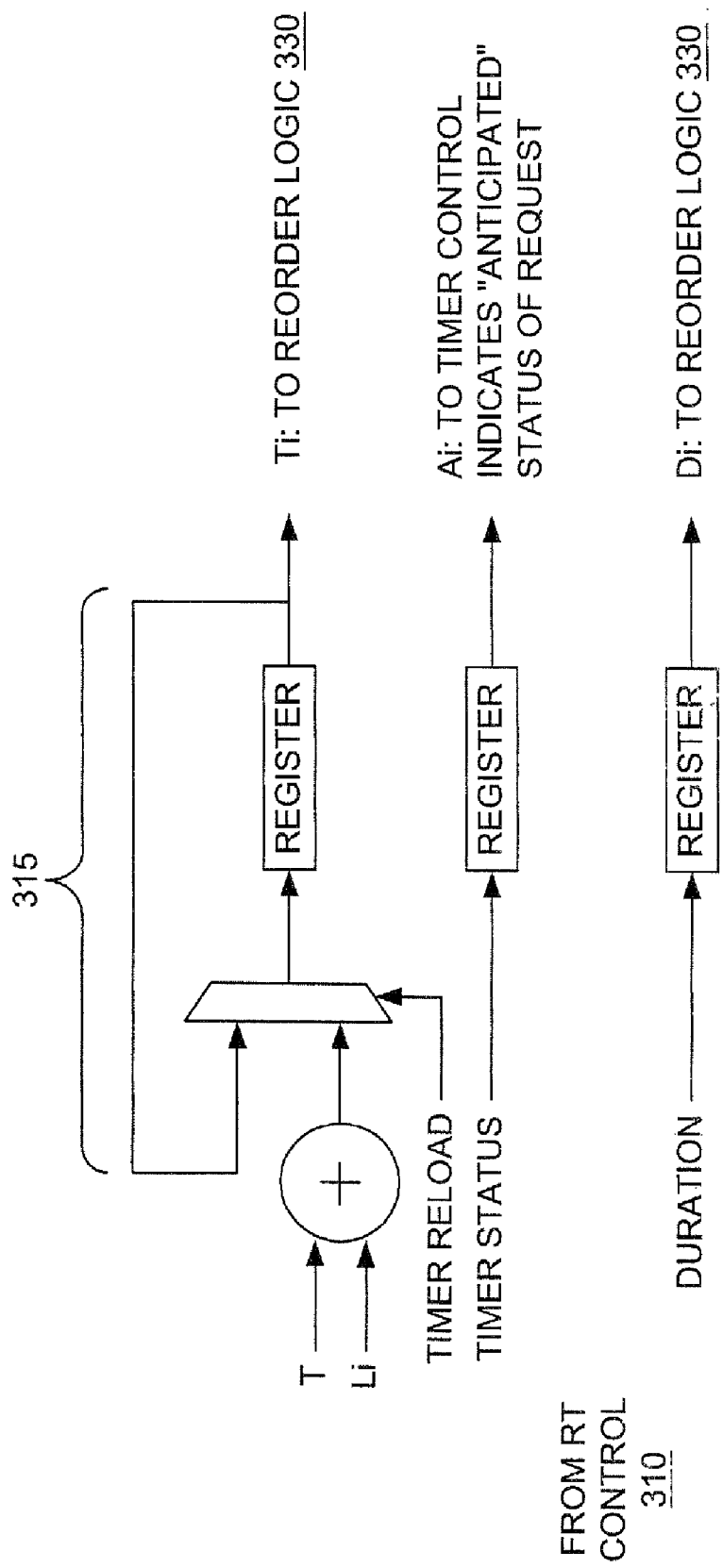
FIG. 6 illustrates elements of the registers in the timers circuit of the scheduler of FIG. 5, according to an embodiment of the invention.

FIG. 5 is a schematic representation of the scheduler 205 in a hardware configuration, according to an embodiment of the invention. FIG. 6 illustrates elements of the registers in the timer circuit 315 of the scheduler 205 of FIG. 5, according to an embodiment of the invention. As discussed below, the scheduler 205 implements the scheduling described above.

Referring to FIGS. 5 and 6, a real-time request control circuit 310 receives real-time requests from clients in a computing device, such as computer system 200, that need real-time access to the shared resource, and issues grants to these requesters. A series of non-real-time request control circuits, illustrated as circuits 320-328 and preferably one for each non-real-time requester, receives non-real-time requests from non-real-time-requester clients in a computing device, such as computer system 200, that need non-real-time access to the shared resource, and grants shared-resource access to these requestors. Circuits 310 and 320-322 interact to make sure that only one requestor is granted access to the shared resource at a time.

The real-time control circuit 310 receives requests from real-time requesters only and controls the register in the timer circuit 315, which holds the status (anticipated or real requests, the deadline value $T_i$, and duration $D_i$). The method by which duration is determined is outside the scope of this circuit. It could be a programmable value, or some value that is derived from request parameters by some mathematical expression that is implemented in hardware as well, which are not shown or described. When a real-time requester issues a new request, the deadline is calculated and put into the $T_i$ register as shown in FIG. 6, and the status is set to 'real', as opposed to 'anticipated'. When the request is granted or has already been granted but no new request is used by the requester, then the status is set to 'anticipated' and the anticipated deadline is reloaded every cycle until a real request is received. While a real request is pending, the value of $T_i$ does not change until the request is serviced.

Figure 7:
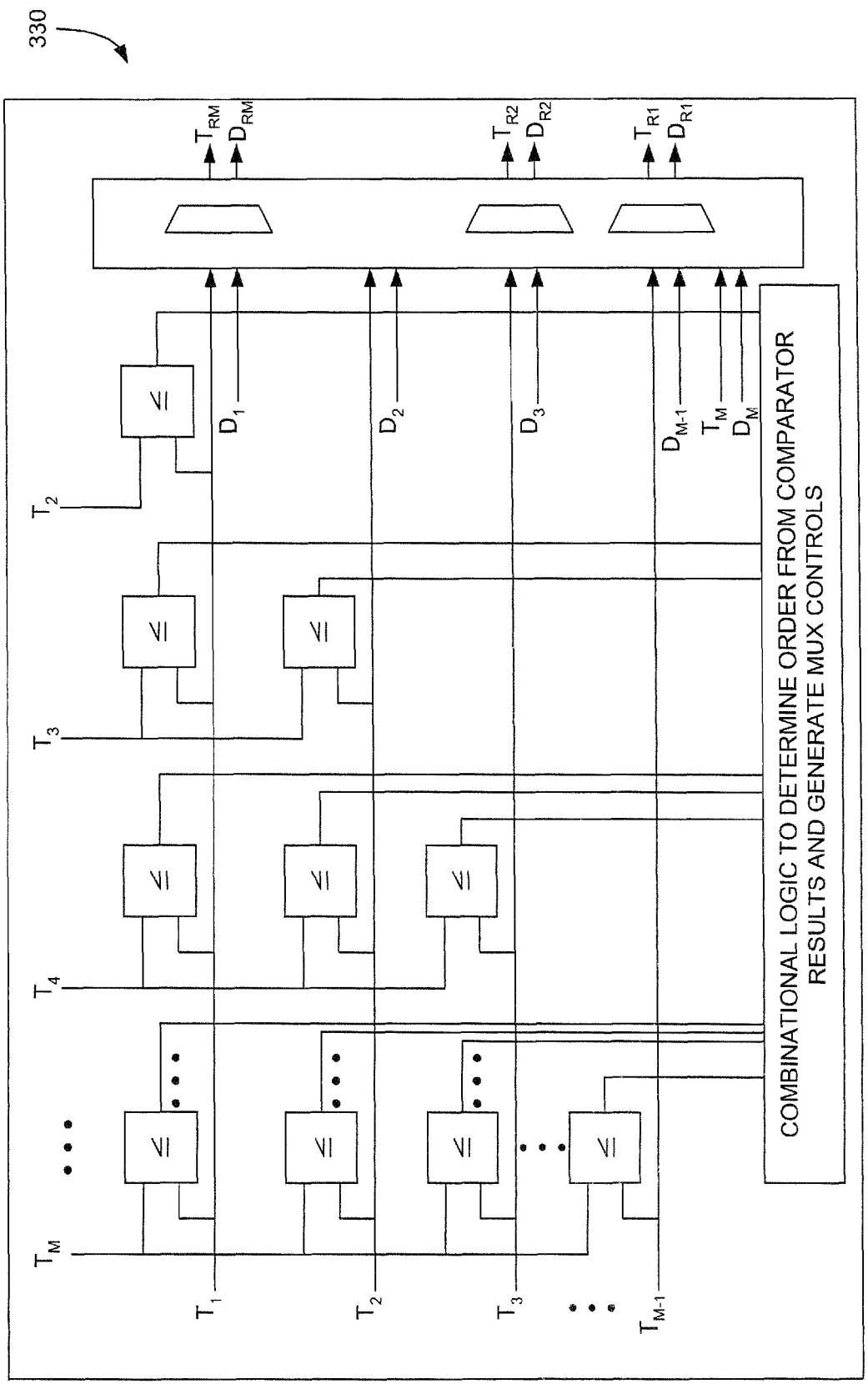
FIG. 7 is a schematic representation of the reorder logic circuit 330 of the scheduler of FIG. 5, according to an embodiment of the invention.
Figure 3:
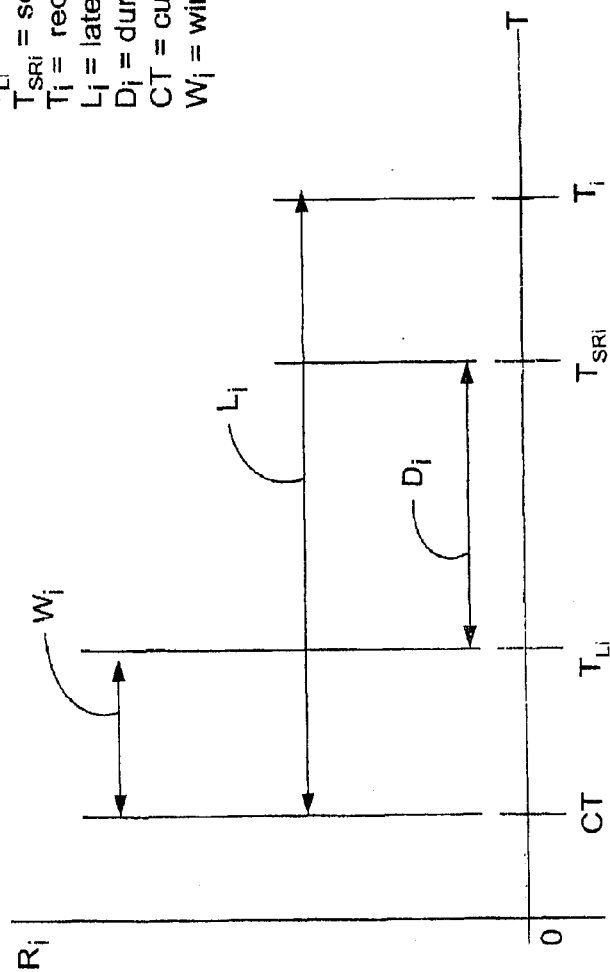

FIG. 7 is a schematic representation of the reorder logic circuit 330 of the scheduler of FIG. 5, according to an embodiment of the invention. The reorder logic circuit 330 performs the task of arranging the M pairs of Ti and Di for each request R in ascending order of Ti value. The output pair ($T_{R1}$, $D_{R1}$) has the earliest (or lowest or soonest) system time T value and the output pair ($T_{RM}$, $D_{RM}$) has the latest (or highest) system time T value. To decide the order of the values, each pair of T values from the list $\{T_1, \ldots, T_M\}$ needs to be compared in magnitude to decide which one is greater.

This requires M*(M−1)/2 comparators. The results are single-bit outputs from each of those comparators indicating that Ti≦Tj for all different combinations of i and j. These results can be combined in logic equations to derive which value is smallest, which one is the next smallest, etc. A set of M multiplexers, each selecting one out of M inputs then produces the final outputs.

Returning to FIG. 5, a network 340 of adders and subtractors calculate the earliest start times of all sequences $\{R1, R2, \ldots R1, R3 \ldots R1, \ldots RM \ldots R1\}$. The MIN value select circuit 350 finds the earliest (or MINi($T_{Li}$)) of all these values ($T_S$) and passes it to its output. The non-real-time control circuits 320-328, with block 320 being labeled as "check if T+D<TS," receive non-real-time requests and their duration values D. The circuits 320-328 check if there is enough time available between current time T and the required real-time service start time $T_S$ to insert a non-real-time request. All non-real-time requests can be checked in parallel. If one or more would fit, a non-real-time request is granted access instead of the earliest real-time requester (R1), otherwise the real (not anticipated) real-time request having the earliest required service completion time is granted access.

In an alternative embodiment, the scheduler 205 may be implemented in software, and the functions of the circuits described in conjunction with FIGS. 5-7 performed by modules of the software.

Although the present invention has been described in considerable detail with reference to certain preferred embodiments, other embodiments are possible. Therefore, the spirit or scope of the appended claims should not be limited to the description of the embodiments contained herein. It is intended that the invention resides in the claims hereinafter appended.

What is claimed is:

1. A system comprising:
a real-time control circuit configured to:
  receive one or more actual real-time requests associated with a fixed service completion time; and
  identify one or more anticipated real-time requests associated with one or more requesting devices that do not have an actual real-time request that has been scheduled for access to a shared resource;
a timer circuit configured to:
  reserve access to the shared resource for the one or more requesting devices associated with the anticipated real-time requests;
  schedule access to the shared resource in response to receiving the actual real-time request for the one or more requesting devices; and
  hold a plurality of real-time requests including the one or more actual real-time requests and the one or more anticipated real-time requests, wherein a latest possible start time for starting service is associated with on-time completion of the plurality of real-time requests; and
a non-real-time control circuit configured to:
  receive one or more non-real-time requests, wherein the one or more non-real-time requests are associated with a duration, and wherein the duration is compared with a window of time corresponding to a difference between the latest possible start time and a current time; and
  in response to the duration being less than the window of time, grant the one or more non-real-time requests access to the shared resource before the plurality of real-time requests.

2. The system of claim 1, further comprising:
- a reorder circuit configured to order the plurality of real-time requests in a list for priority of service, wherein the plurality of real-time requests are ordered by the fixed service completion time and the anticipated deadline; and
- a selection circuit configured to delay the servicing of the plurality of real-time requests and using the latest possible start time to determine a time of completion by which all of the plurality of real-time requests on the list are to be completed.

3. The system of claim 1, wherein the plurality of real-time requests are associated with varying durations.

4. The system of claim 1, wherein the plurality of real-time requests are associated with fixed durations.

5. The system of claim 2, wherein the reorder circuit is configured to reorder the plurality of real-time requests each clock cycle of the shared resource.

6. The system of claim 1, wherein the shared resource comprises a shared memory resource.

7. The system of claim 1, wherein the plurality of non-real-time requests are associated with varying durations.

8. The system of claim 1, wherein the plurality of non-real-time requests are associated with fixed durations.

9. The system of claim 5, wherein the selection circuit is configured to recalculate the latest possible start time at each clock cycle of the shared resource.

10. A method comprising:
- receiving a plurality of active real-time requests for access to a shared resource;
- anticipating a plurality of anticipated real-time requests associated with one or more requesting devices that currently have no active real-time requests that have been scheduled for access to the shared resource;
- determining fixed required service completion times for the plurality of active real-time requests;
- determining a sequence of real-time requests;
- determining a latest possible start time of the sequence of real-time requests;
- reserving access to the shared resource for the one or more requesting devices associated with the plurality of anticipated real-time requests, wherein access to the shared resource is later scheduled in response to receiving an active real-time request for the one or more requesting devices;
- receiving one or more non-real-time requests associated with a duration;
- identifying a window of time between the latest possible start time and a current time;
- determining whether the duration is less than the window of time; and
- in response to determining that the duration is less than the window of time, granting the one or more non-real-time requests access to the shared resource before the sequence of real-time requests.

11. The method of claim 10, further comprising delaying access to the shared resource for the sequence of real-time requests until the latest possible start time.

12. The method of claim 10, wherein the sequence of real-time requests is associated with real-time requests of varying duration.

13. The method of claim 10, wherein the sequence of real-time requests is associated with real-time requests of fixed duration.

14. The method of claim 11, wherein the sequence of real-time requests is determined each clock cycle of the shared resource.

15. The method of claim 14, wherein the latest possible start time is determined at each clock cycle of the shared resource.

16. A memory device having instructions stored thereon that, in response to execution by a processing device, cause the processing device to perform operations comprising:
- receiving a real-time request for access to a shared memory resource, wherein the real-time request is associated with a first requesting device corresponding to an active request; and
- determining an anticipated real-time request for access to the shared memory resource, wherein the anticipated real-time request is associated with a second requesting device that does not have a corresponding active request that has been scheduled for access to the shared memory resource;
- determining a latest possible start time for servicing a plurality of real-time requests comprising the real-time request and the anticipated real-time request;
- reserving access to the shared memory resource for the second requesting device, wherein access to the shared resource is only scheduled in response to receiving the active request for the second requesting device;
- identifying a window of time between the latest possible start time and a current time;
- receiving a non-real-time request for access to the shared memory resource, wherein the non-real-time request is associated with a duration;
- determining whether the duration is less than the window of time; and
- in response to determining that the duration is less than the window of time, granting the non-real-time request access to the shared resource before the latest possible start time.

17. The memory device of claim 16, wherein the operations further comprise scheduling the non-real-time request in response to determining that there is sufficient time for the shared memory resource to service the non-real-time request, the real-time request, and the anticipated real-time request.

18. The memory device of claim 16, wherein the operations comprising determining the latest possible start time include anticipating a deadline for the anticipated real-time request.

19. The memory device of claim 18, wherein the anticipated deadline is based, at least in part, on a latency of the second requesting device, and wherein the latency is assumed to be greater than or equal to a period of time between the second requesting device making any two active real-time requests.

20. The memory device of claim 18, wherein the anticipated deadline is reloaded into a scheduling register once each cycle of the shared memory resource until the second requesting device transmits an active real-time request.

21. The system of claim 1, wherein the one or more anticipated real-time requests are associated with an anticipated deadline, and wherein the plurality of real-time requests are ordered for access to the shared resource according to a comparison of the fixed service completion time and the anticipated deadline.

22. The method of claim 10, further comprising determining anticipated deadlines for the plurality of anticipated real-time requests, wherein determining the sequence of real-time requests comprises ordering the plurality of active real-time requests and the plurality of anticipated real-time requests according to the fixed required service completion times and the anticipated deadlines, respectively.

* * * * *

UNITED STATES PATENT AND TRADEMARK OFFICE
CERTIFICATE OF CORRECTION

| | | |
|---|---|---|
| PATENT NO. | : 8,312,229 B2 | Page 1 of 4 |
| APPLICATION NO. | : 11/457762 | |
| DATED | : November 13, 2012 | |
| INVENTOR(S) | : Bloks | |

It is certified that error appears in the above-identified patent and that said Letters Patent is hereby corrected as shown below:

On the Title Page, illustrative Fig 3 should be deleted and substitute therefor the attached title page consisting of illustrative Fig. 3.

On the Title Page, in Field (56), under "OTHER PUBLICATIONS", in Column 2, Lines 3-4, delete "Management" Oct." and insert -- Management", Oct. --, therefor.

On the Title Page, in Field (57), under "ABSTRACT", in Column 2, Line 7, delete "real real-time" and insert -- real-time --, therefor.

In the Drawings:

In Fig. 3, Sheet 3 of 8, in Line 1, delete "Ri" and insert -- $R_i$ --, therefor at each occurrence throughout the Patent. (As shown on the attached Drawing Sheet.)

In Fig. 3, Sheet 3 of 8, in Line 5, delete "Ti" and insert -- $T_i$ --, therefor at each occurrence throughout the Patent. (As shown on the attached Drawing Sheet.)

In Fig. 3, Sheet 3 of 8, in Line 6, delete "Li" and insert -- $L_i$ --, therefor at each occurrence throughout the Patent. (As shown on the attached Drawing Sheet.)

In Fig. 3, Sheet 3 of 8, in Line 7, delete "Di" and insert -- $D_i$ --, therefor at each occurrence throughout the Patent. (As shown on the attached Drawing Sheet.)

In Fig. 3, Sheet 3 of 8, in Line 9, delete "Wi" and insert -- $W_i$ --, therefor at each occurrence throughout the Patent.

In the Specifications:

In Column 1, Line 23, delete "etc," and insert -- etc., --, therefor.

Signed and Sealed this
Thirtieth Day of April, 2013

Teresa Stanek Rea
*Acting Director of the United States Patent and Trademark Office*

CERTIFICATE OF CORRECTION (continued)
U.S. Pat. No. 8,312,229 B2

In Column 2, Line 52, delete "DESCRIPTION" and insert -- BRIEF DESCRIPTION --, therefor.

In Column 3, Line 7, delete "invention." and insert -- invention; --, therefor.

In Column 4, Line 57, delete "non-real time" and insert -- non-real-time --, therefor.

In Column 6, Line 4, delete "request" and insert -- requests --, therefor.

In Column 7, Line 5, delete "TS" and insert -- $T_S$ --, therefor at each occurrence throughout the Patent.

In Column 7, Line 11, delete "$TL_2=T_2-D_2$," and insert -- $TL_2=T_2-D_2$. --, therefor.

In Column 8, Line 53, delete "(R1)" and insert -- $(R_1)$ --, therefor at each occurrence throughout the Patent.

In Column 8, Line 55, delete "(R2)" and insert -- $(R_2)$ --, therefor at each occurrence throughout the Patent.

In Column 8, Line 56, delete "RM" and insert -- $R_M$ --, therefor at each occurrence throughout the Patent.

In Column 9, Line 10, delete "non-real time" and insert -- non-real-time --, therefor.

In Column 9, Line 38, delete "requestors." and insert -- requesters. --, therefor.

In Column 9, Line 39, delete "requestor" and insert -- requester --, therefor.

In Column 10, Line 10, delete "R3" and insert -- $R_3$ --, therefor at each occurrence throughout the Patent.

(12) United States Patent
Bloks

(10) Patent No.: US 8,312,229 B2
(45) Date of Patent: Nov. 13, 2012

(54) METHOD AND APPARATUS FOR SCHEDULING REAL-TIME AND NON-REAL-TIME ACCESS TO A SHARED RESOURCE

(75) Inventor: Rudolf Henricus Johannes Bloks, Sunnyvale, CA (US)

(73) Assignee: Meyer Bros. Technology Group LLC, Dover, DE (US)

( * ) Notice: Subject to any disclaimer, the term of this patent is extended or adjusted under 35 U.S.C. 154(b) by 1390 days.

(21) Appl. No.: 11/457,762

(22) Filed: Jul. 14, 2006

(65) Prior Publication Data

US 2006/0253675 A1 Nov. 9, 2006

Related U.S. Application Data

(63) Continuation of application No. 10/318,435, filed on Dec. 13, 2002, now Pat. No. 7,093,256.

(51) Int. Cl.
*G06F 13/00* (2006.01)

(52) U.S. Cl. ............. 711/151; 711/154; 711/167; 710/5

(58) Field of Classification Search .................. 711/147, 711/150–152, 167–169; 718/102–104, 107
See application file for complete search history.

(56) References Cited

U.S. PATENT DOCUMENTS

| | | | |
|---|---|---|---|
| 4,989,133 A | 1/1991 | May et al. | |
| 5,291,614 A * | 3/1994 | Baker et al. | 712/35 |
| 5,325,525 A | 6/1994 | Shan et al. | |
| 5,586,264 A * | 12/1996 | Belknap et al. | 725/115 |
| 5,640,563 A * | 6/1997 | Carmon | 718/102 |
| 5,721,922 A | 2/1998 | Dingwall | |
| 5,761,692 A * | 6/1998 | Ozden et al. | 711/4 |
| 5,902,352 A | 5/1999 | Chou et al. | |
| 5,974,439 A | 10/1999 | Bollella | |
| 5,995,745 A | 11/1999 | Yodaiken | |
| 6,028,843 A | 2/2000 | Delp et al. | |
| 6,081,505 A | 6/2000 | Kilkki | |
| 6,105,048 A | 8/2000 | He | |
| 6,112,221 A | 8/2000 | Bender et al. | |
| 6,167,425 A | 12/2000 | Beckhoff | |
| 6,182,197 B1 | 1/2001 | Dias et al. | |
| 6,195,701 B1 | 2/2001 | Kaiserswerth et al. | |
| 6,282,560 B1 | 8/2001 | Eilert et al. | |
| 6,378,052 B1 * | 4/2002 | Genduso et al. | 711/158 |
| 6,385,638 B1 | 5/2002 | Baker-Harvey | |
| 7,093,256 B2 | 8/2006 | Bloks | |

(Continued)

OTHER PUBLICATIONS

Chang et al.; Department of Computer Science; Courant Institute of Mathematical Sciences, New York University, "*Exploiting Application Turability for Efficient, Predictable Parallel Resource Management*" Oct. 7, 1998, pp. 1-18.

(Continued)

*Primary Examiner* — Brian Peugh
*Assistant Examiner* — Nicholas Simonetti
(74) *Attorney, Agent, or Firm* — Stolowitz Ford Cowger LLP

(57) ABSTRACT

A method and apparatus are provided in a computing environment for scheduling access to a resource. The method grants access to the resource by a non-real-time request when the non-real-time request can be completed before the latest possible start time at which a first real-time request must start service to timely complete all actual and anticipated real-time requests, otherwise granting the first real real-time request access to the resource.

22 Claims, 8 Drawing Sheets

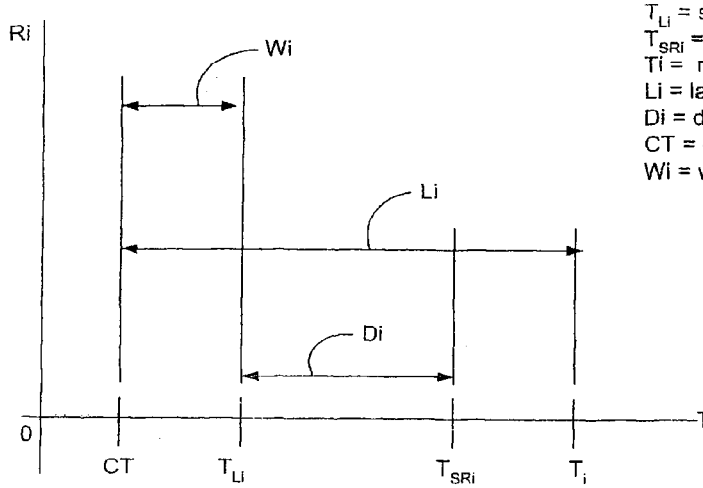

Ri = requester (i=1 . . . N)
T = system time
$T_{Li}$ = service start time
$T_{SRi}$ = service completion time
Ti = required service completion time
Li = latency of requester R
Di = duration of requester R
CT = current system time
Wi = window of time